(12) United States Patent
Engel et al.

(10) Patent No.: US 7,771,588 B2
(45) Date of Patent: *Aug. 10, 2010

(54) SEPARATORY AND EMULSION BREAKING PROCESSES

(75) Inventors: David Birenbaum Engel, The Woodlands, TX (US); Alan E. Goliaszewski, The Woodlands, TX (US); Cato R. McDaniel, The Woodlands, TX (US)

(73) Assignee: General Electric Company, Schenectady, NY (US)

(*) Notice: Subject to any disclaimer, the term of this patent is extended or adjusted under 35 U.S.C. 154(b) by 988 days.

This patent is subject to a terminal disclaimer.

(21) Appl. No.: 11/443,231

(22) Filed: May 30, 2006

(65) Prior Publication Data

US 2007/0111903 A1 May 17, 2007

Related U.S. Application Data

(63) Continuation-in-part of application No. 11/281,532, filed on Nov. 17, 2005, now Pat. No. 7,612,117.

(51) Int. Cl.
| | | |
|---|---|---|
| C10G 1/04 | (2006.01) | |
| B01D 17/05 | (2006.01) | |
| B01D 21/00 | (2006.01) | |
| C09K 8/60 | (2006.01) | |
| B01D 43/00 | (2006.01) | |

(52) U.S. Cl. .................. 208/390; 516/181; 516/191; 507/261; 210/708; 210/710; 210/768; 210/803

(58) Field of Classification Search .............. 516/191, 516/181; 507/261; 210/708, 710, 768, 769, 210/803; 208/390, 391, 180, 188, 186
See application file for complete search history.

(56) References Cited

U.S. PATENT DOCUMENTS

| | | | |
|---|---|---|---|
| 2,106,180 A | 1/1938 | Kreimeier | |
| 2,163,720 A | 1/1939 | Vaughn | |
| 2,250,445 A | 7/1941 | Bruson et al. | |
| 3,779,935 A | 12/1973 | McDougall et al. | |
| 4,401,584 A * | 8/1983 | Tajkowski et al. | ........... 252/194 |
| 4,477,286 A | 10/1984 | Rossmann et al. | |
| 4,522,658 A | 6/1985 | Walker | |
| 4,780,233 A | 10/1988 | Roe | |
| 5,079,036 A | 1/1992 | Roe et al. | |
| 5,080,779 A | 1/1992 | Awbrey et al. | |
| 5,114,607 A | 5/1992 | Deck et al. | |
| 5,120,708 A * | 6/1992 | Melear et al. | ............... 507/126 |
| 5,127,993 A | 7/1992 | Chen | |
| 5,190,105 A | 3/1993 | D'Souza | |
| 5,256,305 A | 10/1993 | Hart | |
| 5,256,329 A * | 10/1993 | Li et al. | ...................... 252/194 |
| 5,324,770 A | 6/1994 | Cosper, III | |
| 5,622,921 A | 4/1997 | Dyer | |
| 5,650,543 A | 7/1997 | Medina | |
| 6,017,368 A | 1/2000 | Steinmann | |
| 6,313,182 B1 | 11/2001 | Lassila et al. | |
| 6,641,986 B1 | 11/2003 | Zhang et al. | |
| 6,864,395 B2 | 3/2005 | Lassila et al. | |
| 7,428,926 B2 * | 9/2008 | Heins | ......................... 210/805 |
| 2007/0111903 A1 * | 5/2007 | Engel et al. | .................. 507/261 |
| 2009/0321325 A1 * | 12/2009 | Yeggy et al. | ................. 208/390 |

FOREIGN PATENT DOCUMENTS

| | | | |
|---|---|---|---|
| CA | 2 478 622 | * | 5/2005 |
| EP | 0 192 130 A2 | | 8/1986 |
| JP | 2002-338968 | | 11/2002 |

OTHER PUBLICATIONS

Air Products Material Safety Data Sheet; MSDS No. 300000004774; Oct. 30, 2005; Version 1.9.
Bagci et al., "Investigation of Surfactant-SAGD Process in Fractured Carbonate Reservoirs", Paper 2004-087, CIPC 2004, Calgary, Alberta, Canada, Jun. 8-10, 2004.
Chemicals—Surfynol and Dynol Surfactants and Additives—Air Products and Chemicals, Inc.;http://www.airproducts.co.uk/chemicals/surfynolAdditives.htm, (Jul. 2006).

* cited by examiner

*Primary Examiner*—Daniel S Metzmaier
(74) *Attorney, Agent, or Firm*—Wegman, Hessler & Vanderburg

(57) ABSTRACT

The invention pertains to the use of a class of acetylenic surfactants to resolve or break water and oil emulsions. The surfactants are of particular advantage in resolving crude oil emulsions of the type encountered in desalter and similar apparatus designed to extract brines from the crude as they partition to the aqueous phase in the desalter. Also, the surfactants may be used to separate oil from oil sands and similar oil/solids matrices.

12 Claims, No Drawings

SEPARATORY AND EMULSION BREAKING PROCESSES

CROSS-REFERENCE TO RELATED APPLICATIONS

The present application is a continuation-in-part of U.S. Application Ser. No. 11/281,532, filed Nov. 17, 2005, now U.S. Pat. No. 7,612,117.

FIELD OF INVENTION

The invention pertains to methods for resolving or breaking various oil and water emulsions by the use of certain classes of acetylenic surfactants. These surfactants may be used by themselves, or optionally, they can be conjointly used with additional surfactants in resolving the emulsions. Additionally, oil phases such as bitumen may be separated from tar sands and similar solid matrices.

BACKGROUND OF THE INVENTION

All crude oil contains impurities which contribute to corrosion, heat exchanger fouling, furnace coking, catalyst deactivation, and product degradation in refinery and other processes. These contaminants are broadly classified as salts, bottom sediment, and water (BS+W), solids, and metals. The amounts of these impurities vary, depending upon the particular crude. Generally, crude oil salt content ranges between about 3-200 pounds per 1,000 barrels (ptb).

Native water present in crude oils includes predominately sodium chloride with lesser amounts of magnesium chloride and calcium chloride being present. Upon thermal hydrolysis, chloride salts are the source of highly corrosive HCl, which is severely damaging to refinery tower trays and other equipment. Additionally, carbonate and sulfate salts may be present in the crude in sufficient quantities to promote crude preheat exchanger scaling.

Solids other than salts are equally harmful. For example, sand, clay, volcanic ash, drilling muds, rust, iron sulfide, metal, and scale may be present and can cause fouling, plugging, abrasion, erosion and residual product contamination. As a contributor to waste and pollution, sediment stabilizes emulsions in the form of oil-wetted solids and can carry significant quantities of oil into the waste recovery systems.

Metals in crude may be inorganic or organometallic compounds which consist of hydrocarbon combinations with arsenic, vanadium, nickel, copper, iron, and other metals. These materials promote fouling and can cause catalyst poisoning in subsequent refinery processes, such as catalytic cracking methods, and they may also contaminate finished products. The majority of the metals carry as bottoms in refinery processes. When the bottoms are fed, for example, to coker units, contamination of the end-product coke is most undesirable. For example, in the production of high grade electrodes from coke, iron contamination of the coke can lead to electrode degradation and failure in processes, such as those used in the chlor-alkali industry.

Desalting is, as the name implies, a process that is adapted (although not exclusively) to remove primarily inorganic salts from the crude prior to refining. The desalting step is provided by adding and mixing or emulsifying with the crude a few volume percentages of fresh water to contact the brine and salt. In crude oil desalting, a water in oil (W/O) emulsion is intentionally formed with the water admitted being on the order of about 3-10 volume % based on the crude oil. Water is added to the crude and mixed intimately to transfer impurities in the crude to the water phase. Separation of the phases occurs due to coalescence of the small water droplets into progressively larger droplets and eventual gravity separation of the oil and underlying water phase.

Demulsification agents are added, usually upstream from the desalter, and have a variety of purposes such as to help in providing maximum mixing of the oil and water phases, dehydrate the crude oil, provide faster water separation, better salt extraction or improved solids extraction and generate oil-free effluent water. Known demulsifying agents include water soluble organic salts, sulfonated glycerides, sulfonated oils, acetylated caster oils, ethoxylated phenol formaldehyde resins, polyols, polyalkylene oxides, ethoxylated amines, a variety of polyester materials, and many other commercially available compounds.

Desalters are also commonly provided with electrodes to impart an electrical field in the desalter. This serves to polarize the dispersed water molecules. The so-formed dipole molecules exert an attractive force between oppositely charged poles with the increased attractive force increasing the speed of water droplet coalescence by from ten to one hundred fold. The water droplets also move quickly in the electrical field, thus promoting random collisions that further enhance coalescence.

Upon separation of the phases from the W/O emulsions, the crude is commonly drawn off the top of the desalter and sent to the fractionator tower in crude units or other refinery processes. The water phase may be passed through heat exchanges or the like and ultimately is discharged as effluent.

In addition to the need for effective emulsion breakers in resolving the W/O emulsions in desalters and the like, W/O emulsions are also commonly employed in certain bitumen demulsification processes. The emulsions encountered can be of the oil in water type, wherein the density of the hydrocarbon materials is greater than that of water. In these cases, the hydrocarbon phase can be taken from the bottom of the vessel used for separation.

Emulsions are also formed during the production of crude oil. Water is associated with the geological formation and will be co-produced from the oil well. Also, water or steam may be added to the formation in enhanced oil recovery operations that will contribute water to the produced oil stream. Turbulence applied by choke points in the wellhead or production adds sufficient mechanical force to create an emulsion from the oil/water mixture. This water needs to be separated from the produced oil, as pipeline and other collection or transportation systems have specs on maximum amounts of water that can be associated with the oil. The water can lead to corrosion issues in the pipeline. Emulsion breakers are applied to speed the separation of the oil and water during production. Various types of equipment have been used to effect this separation such as dehydrators or heat treaters.

Emulsions that become difficult to break or resolve as a result of refinery reworks, tankwashes, interfaces and others are often referred to as "slop". This "slop" cannot be discharged directly due to environmental concerns so that it has therefore become important to efficiently resolve or separate the emulsion constituents into an oleaginous (oil) or organic phase and a combined mud/non-oleaginous (i.e.) water phase. The oil phase may be used as a process fluid for refinery or other processes or recycled for down hole usage. The mud/water phase may be sent to further separation processes to separate the water for discharge or other use and the mud for possible recycling into down hole operations. Additionally, in some cases, the drilling mud actually seeps out of formation into the crude oil that is being extracted to form an undesirable drilling mud emulsion containing crude oil, water, and sometimes clay as components.

Accordingly, there is a need in the art to provide effective demulsifying treatments to resolve or break water and oil emulsions, particularly the crude oil emulsions encountered in desalter apparatuses, water and bitumen emulsions, and drilling mud emulsions. The emulsions may also be encountered in heat treaters, free water knockout apparatus, inclined plate separation apparatus, water separation apparatus, hydrocyclones, and centrifuges.

SUMMARY OF THE INVENTION

The invention pertains to the use of a class of acetylenic surfactants to resolve or break water and oil emulsions. The surfactants are of particular advantage in resolving crude oil emulsions of the type encountered in desalter, oil field dehydration vessels, and similar apparatus designed to extract brines from the crude as they partition to the aqueous phase in the desalter. Although the invention is of particular advantage in the breaking or resolution of O/W emulsions, it may also be successfully employed in the resolution of W/O type emulsions.

More specifically, the acetylenic surfactant is a member or members from the groups represented by the Formulae Ia and Ib wherein, Formula Ia is

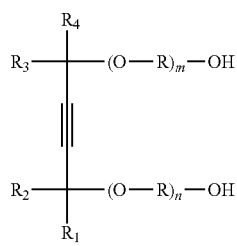

Ia and wherein Ib is

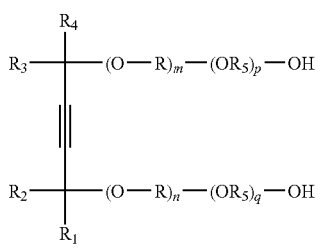

Ib wherein in Formulae Ia and Ib R is $-(CH_2-CH_2-)$; $R_5$ is $-(CH_2(CH_3)CH-)$ or $-(CH_2-CH_2-CH_2-)$; $R_1$ and $R_4$ are a straight or a branched chain alkyl having from about 3 to 10 C atoms or an aryl group; $R_2$ and $R_3$ are H, an alkyl chain having 1 to 5 C atoms, or an aryl group, and m, n, p, and q are numbers that range from about 0 to about 30.

DETAILED DESCRIPTION OF EXEMPLARY EMBODIMENTS

Although the present invention is primarily described in conjunction with the resolution of a crude oil/water emulsion in a conventional desalter or the like or in an oilfied dehydration vessel, the artisan will appreciate that in a broader sense, the invention is applicable to resolution of a variety of oil and water emulsions. For example, emulsions encountered in the storage and processing of a variety of liquid hydrocarbon media including vacuum residia, solvent deasphated oils, gas oils, gasolines, diesel fuel, shale oil, liquefied coal, beneficiated tar sand, bitumen, etc., may all be treated in accordance with the invention.

The acetylenic surfactants Ia, Ib may be added to either the oil phase, the water phase, or the emulsion itself. Either way, the surfactant Ia, Ib must be brought into contact with the emulsion so as to promote mixing therewith to effectively perform its intended function as an emulsion breaker. As used herein, the surfactant is said to be brought into contact with the emulsion. This means that the surfactant can be added to either the hydrocarbon phase, the water phase, or the formed emulsion itself. Under all of these conditions, the surfactant ultimately contacts the emulsion. In one exemplary embodiment of the invention, the surfactant Ia, Ib is intimately and thoroughly mixed with the wash water that is fed into the desalter to thereby mix with and contact the emulsion.

As stated above, these acetylenic functional surfactants have the Formula Ia or Ib wherein Ia is

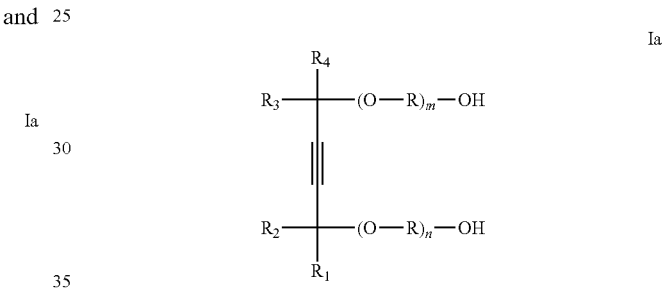

Ia and wherein Ib is

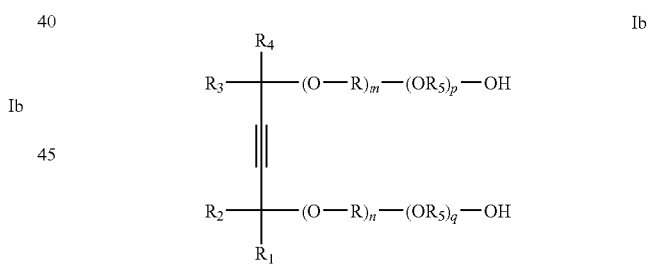

Ib wherein R is $-(CH_2-CH_2-)$; $R_5$ is $-(CH_2(CH_3)CH-)$ or $-(CH_2-CH_2-CH_2-)$; $R_1$ and $R_4$ are a straight or a branched chain alkyl having from about 3 to 10 C atoms or an aryl group; $R_2$ and $R_3$ are H, an alkyl chain having 1 to 5 C atoms, or an aryl group, and m, n, p, and q are numbers that range from about 0 to about 30.

Surfactants of the classes Ia and Ib are commercially available from Air Products Inc., Allentown, Pa., under a variety of "Sulfonyl", "Dynol", and "Envirogem" trademark designations and are described in the literature as being non-ionic surfactants based on acetylenic diol chemistry. Available products includes ethoxylated and ethoxylated/propoxylated versions of the diols. Commercially available products include:

(1) 2,4,7,9-tetramethyl-5-decyne-4,7 diol (TMDD-5)
(2) 2,5,8,11-tetramethyl-6-dodecyne-5,8 diol (TMDD-6)

(3) (TMDD-5)-1.3 mole ethoxylate
(4) (TMDD-5)-3.5 mole ethyoxylate
(5) (TMDD-5)-5.1 mole ethoxylate
(6) (TMDD-5)-10.0 mole ethoxylate
(7) (TMDD-5)-30.0 mole ethoxylate
(8) (TMDD-6)-4.0 mole ethyoxylate
(9) (TMDD-5)-5 mole ethoxylate/2 mole propoxylate;
   m+n in Formula Ib=5 and p and q=2.

With regard to the diol surfactants (i.e., those in Formula Ia wherein m and n are both zero), these are, as stated above, commercially available and can be made via the techniques reported in U.S. Pat. Nos. 2,250,445; 2,106,180; and 2,163,720, all of which are incorporated by reference herein. In summary of these disclosures, these tertiary acetylenic diols may be formed via mixing of a saturated ketone with an alkali metal hydroxide, and the resulting mixture is then reacted with acetylene. This results in production of the acetylenic monohydroxide product and, more importantly, the geminate acetylenic glycol.

The tertiary acetylenic diols, preferably (TMDD-5) and (TMDD-6) are then used as the precursors to form the EO and/or EO/PO adducts in accord with the procedures set forth for example in U.S. Pat. Nos. 6,313,182 and 6,864,395; both of which are incorporated by reference herein. As aforementioned, both the EO and EO/PO derivatives are also commercially available. Briefly, the procedures reported in these patents involve reaction of the precursor with the requisite quantities of EO and/or EO followed by PO in the presence of a suitable catalyst including trialkylamines and Lewis acids, particularly $BF_3$. Also, the compositions may be prepared by reaction of a pre-formed acetylenic diol ethoxylate with PrO in the presence of a catalyst.

Similarly, aromatic compounds can be made wherein some or all of the $R_1$-$R_4$ groups may independently comprise an aryl moiety. For example, 2,4, dimethyl-7-phenyl-5 octyne-4,7-diol was made via the following process:

To a solution of 12.6 (0.1 mol) g of 3,4-dimethyl-1-hexyn-3-ol in 500 mL in diethyl ether at 0° C. was added drop wise a solution of n-BuLi (2.0 M, 110 mL, 0.22 mols) over a period of 1 hour. The reaction mixture was stirred for an additional 30 minutes, treated with a solution of acetophenone (12 g, 0.1 mol) in 100 mL ether and allowed to warm to room temperature. The solution was quenched with 600 mL of a 0.1 N HCl solution, and the organic phases separated. The aqueous phase was further extracted with ether (3×100 mL), and the combined organic phases were washed with saturated $NaHCO_3$ solution (3×100 mL), water (2×100 mL) and dried over molecular sieves.

From about 1 to 500 ppm of the acetylenic surfactants from the groups Ia and/or Ib are added to make contact with the emulsion based on one million parts of the emulsion. At present, it is preferred to add the surfactant to either the water wash flowing into the desalter, to the crude oil stream or directly to the emulsion so as to ensure thorough mixing of the surfactant with the emulsion.

In addition to the acetylenic surfactants Ia and Ib, additional surfactants may be added to contact and aid in resolution of the emulsion. These additional surfactants II include polyols, EP/PO polymers, alkylphenolformaldehyde resin ethoxylates, ethoxylated amines, ethoxylated polyamines, alkylphenolethoxylates, aromatic sulfonates, and sulfo succinates. These additional surfactants II may also be added in necessary amounts so that the total surfactant I or I and II present to contact the emulsion is from about 1 to about 1,000 ppm based on one million parts of the emulsion.

In those instances in which the surfactants I and II are conjointly used, they may be present in the following weight percentage range, based on 100 wt % of the combination: I:II of about I 1-90%:II 99 wt %-10 wt %.

One particular class of additional surfactants (II) has shown enhanced efficacy in preliminary tests when used conjointly with the surfactant I. Specifically, this surfactant (II) is chosen from EO/PO polymers having the Formula II:

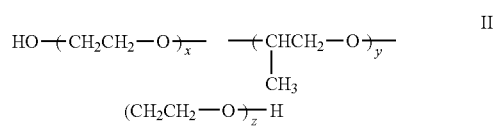

wherein x, y, and z are each at least 1 and are such as to provide the compound with a molecular weight of about 500 or higher.

Block copolymers in accordance with Formula II preferably have molecular weights of from about 500 to 30,000 with a molecular weight of about 1,000-10,000 being more preferred. Preferred are those block copolymers wherein the combined EtO moieties comprise about 20-80% by weight of the surfactant (II). These preferred surfactants II are available from BASF under the "Pluronic" designation. Most preferred is a block copolymer wherein the EtO moieties make up about 40% by weight of the polymer, and the overall mw of the block copolymer is about 4,000.

One particularly preferred conjoint treatment is Ia-(TMDD-5) with II EO/PO block copolymer—P-84. The (TMDD-5) is present in an amount of about 1-50% of the conjoint treatment, more preferably in an amount of about 1-20% by weight.

The invention will now be further described in conjunction with the following examples which are illustrative of a variety of exemplary embodiments of the invention and should not be used to narrowly construe same.

EXAMPLES

In order to assess the emulsion breaking efficacy of candidate materials, simulated desalter tests were undertaken. The simulated desalter comprises an oil bath reservoir provided with a plurality of test cell tubes dispersed therein. The temperature of the oil bath can be varied to about 300° F. to simulate actual field conditions. The test cells are placed into an electrical field to impart an electrical field of variable potential through the test emulsions.

Example 1

97 ml of crude oil along with 3 ml of D.I. water were admitted to each test cell along with the candidate emulsion breaker materials. The crude/water/treatment mixtures were homogenized by mixing each of the test cell tubes at 13,000 rpm for 2 seconds. The test cell tubes were heated to about 250° F. Water drop (i.e., water level) in ml was observed for each sample after the predetermined time intervals according to the schedule. Results are shown in Table 1.

TABLE 1

| Treatment | ppm | 1 min | 2 min | 4 min | 8 min | 16 min | 32 min | 64 min | Sum | I/F |
|---|---|---|---|---|---|---|---|---|---|---|
| Blank | 0 | 0 | 0 | 0.1 | 0.1 | 0.2 | 0.2 | 0.2 | 0.8 | .4 IF |
| 1 | 0.5 | 0 | 0.2 | 0.4 | 0.8 | 1.6 | 2 | 2.25 | 7.25 | |
| 1 | 2 | 0 | 0.2 | 0.8 | 1.4 | 2 | 2.5 | 2.5 | 9.4 | |
| 1 | 5 | 0 | 0.1 | 1.4 | 1.8 | 2.8 | 3 | 3 | 12.1 | |
| 1 | 10 | 0 | 0.1 | 0.8 | 1.6 | 2.4 | 2.5 | 3 | 10.4 | |
| 2W157 | 1 | 0 | 0 | 0.4 | 0.6 | 1 | 1.8 | 2 | 5.8 | |
| 2W157 | 5 | 0 | 0 | 1.4 | 1.6 | 2 | 3 | 3 | 11 | |
| 2W157 | 10 | 0 | 0 | 1 | 1.4 | 2 | 2.5 | 2.5 | 9.4 | |
| Blank | 0 | 0 | 0.2 | 0.8 | 1 | 1.4 | 2 | 2 | 7.4 | .3 IF |
| 1 | 0.5 | 0 | 0.2 | 2.2 | 3 | 4 | 4 | 5 | 18.4 | |
| 1 | 2 | 0 | 0.1 | 2.5 | 4 | 4.5 | 5 | 5 | 21.1 | |
| 1 | 5 | 0 | 0.1 | 1.8 | 3 | 3.5 | 4 | 4.5 | 16.9 | |
| 1 | 10 | 0 | 0.2 | 1.4 | 2 | 2.5 | 3 | 3.5 | 12.6 | |
| 2W157 | 1 | 0 | 0.2 | 2 | 3 | 3.5 | 4 | 4.5 | 17.2 | |
| 2W157 | 5 | 0 | 0.2 | 2.5 | 3.5 | 4.5 | 5 | 5 | 20.7 | |
| 2W157 | 10 | 0 | 0.2 | 2.5 | 4 | 4 | 4.5 | 4.5 | 19.7 | |
| Blank | 0 | 0 | 0.2 | 1 | 2 | 2.5 | 3 | 4 | 12.7 | 0.3 |
| P-84 | 5 | 0 | 0.4 | 1.4 | 2 | 3 | 3.5 | 5 | 15.3 | |
| 2 | 5 | 0 | 0.4 | 3 | 3.5 | 4 | 4.5 | 5 | 20.4 | |
| 5 | 5 | 0 | 0.4 | 3 | 3.5 | 3.5 | 4 | 5 | 19.4 | 0.5 |
| 3 | 5 | 0 | 0.4 | 2.5 | 3 | 3.5 | 4.5 | 4.5 | 18.4 | |
| 4 | 5 | 0 | 0.2 | 1.8 | 3 | 3.5 | 3.5 | 4 | 16 | 0.5 |
| Span 80 | 5 | 0 | 0.2 | 0.8 | 3 | 3.5 | 4 | 4 | 15.5 | 1 |
| 2 | 1 | 0 | 0 | 2 | 3.5 | 4 | 4 | 5 | 18.5 | | ppm = parts per million of treatment based on 1 million parts of combined crude oil and water.
Treatment 1 = combination of a) (TMDD-5)- and b) ethoxylated alkyl phenol
Treatment 2 = combination of a) (TMDD-5)- and c) triblock copolymer [(PEO)$_{19}$(PPO)$_{43}$(PEO)$_{19}$] wherein a is present in amount of 3 wt% remainder c.
Treatment 3 = (TMDD-5) - 1.3 mole ethoxylate
Treatment 4 = (TMDD-5) - 3.5 mole ethoxylate
Treatment 5 = (TMDD-5) - ethoxylated - surfynol DF-37 - Air Products
2W157 = emulsion breaker; available GE Betz
P-84 = triblock copolymer [(PEO)$_{19}$(PPO)$_{43}$(PEO)$_{19}$]
Span 80 = sorbitan oleate

Example 2

Another series of tests was performed using the simulated desalter apparatus described in Example 1. In this series of test, 95 ml of crude oil and 5 ml of D.I. water plus treatment were added to the test cells. Results are shown in Table 2.

TABLE 2

| Treatment | ppm | 1 min | 2 min | 4 min | 8 min | 16 min | 32 min | Sum |
|---|---|---|---|---|---|---|---|---|
| Blank | 0 | 0 | 0.2 | 1.4 | 2 | 2.5 | 4.5 | 10.6 |
| 2W157 | 5 | 0 | 2 | 3 | 4.5 | 5 | 5 | 19.5 |
| 6 | 5 | 0 | 0.4 | 2 | 2.5 | 2.5 | 3 | 10.4 |

TABLE 2-continued

| Treatment | ppm | 1 min | 2 min | 4 min | 8 min | 16 min | 32 min | Sum |
|---|---|---|---|---|---|---|---|---|
| P-84 | 5 | 0 | 1 | 2.5 | 3 | 4 | 5 | 15.5 |
| 2 | 5 | 0 | 2.5 | 4.5 | 4.8 | 5 | 5 | 21.8 |

Treatment 6 = (TMDD-5)-

Example 3

Another test series was undertaken to assess the efficacy of candidate materials in breaking bitumen emulsions. These tests were similar to those reported in Example 1 with exceptions noted in the table and the fact that an electrical field was not imparted to the test emulsions. Results are reported in Table 3.

TABLE 3

Ratio of bitumen emulsion to diluent 80%::20%
Conditions: Blended at 10,000 rpm for THREE seconds
Grids off

| | | Amount of emulsion remaining after | | | | | | | Diluent + mL |
|---|---|---|---|---|---|---|---|---|---|
| Treatment | ppm | 1 min | 2 min | 4 min | 8 min | 16 min | 32 min | sum | Oil recovered |
| Blank | 0 | 80 | 80 | 80 | 80 | 80 | 80 | 480 | 0 |
| 2W157 | 500 | 50 | 50 | 50 | 50 | 50 | 50 | 300 | 180 |
| 7 | 500 | 45 | 48 | 48 | 50 | 50 | 50 | 291 | 189 |
| 8 | 500 | 80 | 80 | 80 | 60 | 70 | 65 | 435 | 45 |
| 9 | 500 | 53 | 53 | 54 | 52 | 54 | 54 | 320 | 160 |
| 10 | 500 | 80 | 80 | 80 | 60 | 70 | 63 | 433 | 47 |
| 11 | 500 | 50 | 50 | 50 | 50 | 55 | 58 | 313 | 167 |
| 12 | 500 | 45 | 47 | 47 | 47 | 47 | 47 | 280 | 200 |

Without treatment, the bitumen emulsion was completely unbroken under the conditions used.

Treatment 7=combination of a) TMDD-5 and b) PEO/PPO block copolymer, PEO=40 molar %; mw≈4,000; a) is present in amount of 5 wt %; remainder b)

Treatment 8=combination of a) TMDD-5 and b) PEO/PPO block copolymer, PEO=30 molar %, mw≈4,000; a) is present in an amount of 5 wt %; remainder b)

Treatment 9=combination of a) TMDD-5 and b) PEO/PPO block copolymer, PEO=40 molar %, mw≈4,000; a) is present in an amount of 10 wt %; remainder b)

Treatment 10=combination of a) TMDD-5 and b) PEO/PPO block copolymer, PEO=30 molar %, mw≈4,000; a) is present in an amount of 10 wt %; remainder b)

Treatment 11=combination of a) TMDD-5 and b) PEO/PPO block copolymer, PEO=50 molar %, mw≈5,000; a) is present in an amount of 20 wt %, remainder b)

Treatment 12=combination of a) TMDD-5 and b) PEO/PPO block copolymer; PEO=40 molar %, mw≈4,000; a) is present in an amount of 20 wt %, remainder b).

Example 4

In order to further demonstrate the efficacy of the treatment additives of the invention in separating bitumen from oil sands ore, 10 g of the oil sand ore were placed in 50 ml vials. The vials were heated at 195° F. for 1 hour. 30 ml of DI water with 0.4 g/L NaOH were added to each of the vials and then the desired treatments were added in a HAN solution (2% solution) to the vials. Each of the vials was hand shaken for about 3-4 seconds and then heated at 125° F. with mechanical agitation for 1 hour. The vials were allowed to settle and then 1 mL of the supernatant from each vial was removed and added to a 10 mL xylene/acetone mixture (1:1). These samples were then evaluated spectroscopically at 410 nm. This wavelength was chosen as one at which absorbance of oil can be readily detected. Increasing absorbance of the test samples is indicative of improved separation of the bitumen into the water phase from the ore.

Results are given in Table 4 as follows.

TABLE 4

| Example | Additive | ppm Additive | uL* | 410 nm Abs |
|---|---|---|---|---|
| 4-A | Blank | 0 | 550 HAN | 0.305 |
| 4-B | P104/A104 | 275 | 500/50 | 0.321 |
| 4-C | P84/P104/A104 | 275 | 450/50/50 | 0.291 |
| 4-D | DTG 62/P104/A104 | 275 | 450/50/50 | 0.302 |
| 4-E | Span 40/P104/A104 | 275 | 450/50/50 | 0.281 |
| 4-F | Blank | 0 | 550 HAN | 0.311 |
| 4-G | P104/A104 | 275 | 500/50 | 0.277 |
| 4-H | P84/P104/A104 | 275 | 450/50/50 | 0.291 |
| 4-I | DTG 62/P104/A104 | 275 | 450/50/50 | 0.297 |
| 4-J | Span 40/P104/A104 | 275 | 450/50/50 | 0.292 |
| 4-K | A104 | 275 | 550 | 0.501 |
| 4-L | A104 | 275 | 550 | 0.426 |

*all 2% AS (active strength)
ppm based on one million parts water phase

SUMMARY

| Treatment | Average 410 nm abs |
|---|---|
| Blank | 0.308 |
| P104/A104 | 0.299 |
| P84/P104/A104 | 0.291 |
| DTG 62/P104/A104 | 0.288 |
| Span 40/P104/A104 | 0.2865 |
| A104 | 0.4635 |

P104 = PEO/PPO block copolymer; PEO present 40 molar %; mw ≈ 3,000
A104 = TMDD-5
P84 = see Ex. 1
DTG 62 = ethoxylated glycerin
Span 40 = sorbitan monopalmitate Example 5

Additional experiments were undertaken using the procedure set forth in Example 4. Results are shown in Table 5.

TABLE 5

| Example | Additive | ppm | uL | 410 nmAbs |
|---|---|---|---|---|
| 5A | Blank | 0 | 550 HAN | 0.651 |
| 5B | P84 | 275 ppm | 550 | 0.66 |
| 5C | A104 | 275 ppm | 550 | 0.77 |
| 5D | P84/A104 | 275 ppm | 500/50 | 0.67 |
| 5E | Blank | 0 | 550 HAN | 0.11 |
| 5F | P84 | 275 ppm | 550 | 0.5478 |
| 5G | A104 | 275 ppm | 550 | 0.893 |
| 5H | P84/104 | 275 ppm | 500/50 | 0.7 |

SUMMARY

| Treatment | Average 410 nm Abs |
|---|---|
| Blank | 0.3805 |
| P84 | 0.6039 |
| A104 | 0.8315 |
| P84/A104 | 0.685 |

*all 2% AS (active strength)

Example 6

The procedures of Example 4 were again repeated. Results are shown in Table 6.

TABLE 6

| Example | Additive | ppm | uL* | 410 nm Abs |
|---|---|---|---|---|
| 6A | Blank | 0 | 550 HAN | 0.251 |
| 6B | A104 | 100 | 550 | 0.241 |
| 6C | A104 | 275 | 550 | 0.414 |
| 6D | A104 | 550 | 500/50 | 0.367 |
| 6E | Blank | 0 | 550 HAN | 0.254 |
| 6F | A104 | 100 | 550 | 0.212 |
| 6G | A104 | 275 | 550 | 0.383 |
| 6H | A104 | 550 | 500/50 | 0.288 |

| SUMMARY | |
| --- | --- |
| Treatment | Average 410 nm Abs |
| Blank | 0.2525 |
| A104 (100 ppm) | 0.2265 |
| A104 (275 ppm) | 0.3985 |
| A104 (550 ppm) | 0.3275 |

As demonstrated in conjunction with Examples 3-6, the hydroxy acetylenic compounds are efficacious in helping to separate bitumen from oil sands. Oil sands, also called tar sands, are found in many countries throughout the world. The primary formation is in the province of Alberta, Canada wherein the oils sands are formed basically of sands and crude oil. The oil sands is also referred to as "ore" and is approximately 90% sand, some water, and 10% crude oil. The crude oil is extra heavy crude and can be characterized as a naturally occurring viscous mixture of hydrocarbons that are generally heavier than pentane. This crude also contains sulphur compounds and will not flow to a well in its natural state. Accordingly, it is harder to refine and generally of lesser quality than other crudes. The crude is often referred to as "tar" or "bitumen".

At present, two different processes are used to extract this heavy crude oil or bitumen. In the mining method, the surface oil sand is transported and washed in a large vessel. The oil sands (also called ore) is then combined with water, NaOH, and air in a Primary Separation Vessel (PSV) wherein the heavy crude oil is floated in the form of a froth or slurry with the sand and clay allowed to settle. In some cases, the froth or slurry is then fed to a second tank for further mixing and tumbling with water. Most of the sand and clay is removed with the bitumen containing froth or slurry being skimmed off the top and diluted with naptha (HAN) to dissolve the oil. The naptha addition step may be followed by centrifuging to further remove sand and clay and the naptha is then separated from the oil via distillation. The heavy crude is processed via thermal cracking and hydrotreating with the various distillates being recombined to form "Synthetic Crude Oil" that is sent to refineries for further processing.

The second method for extracting the bitumen from the tar sand is the "Steam Assisted Gravity Drainage" (SAGD) method. This method contrasts with mining in that SADG is not a surface operation. Instead SADG involves underground operations and consists of a pair of wells drilled into the formation about five meters apart from each other. Steam is injected into the formation through the top well. The steam softens the tar like bitumen and enables it to drain in the form of an emulsion to the lower well in the formation from where it is pumped to the surface. The emulsion may then be washed with additional water and treated at this point in a member similar to crude recovered by bitumen mining operations such as by addition of caustic/water solutions and dissolution in naptha or similar solvent. As used herein, "subterranean" shall refer to both underground systems and those operating at sea level in which the earth's surface is penetrated.

In either case, it is obviously desirable to increase the amount of bitumen actually recovered from the oil or tar sand. We have noted that hydroxylated acetylenic surfactants when brought into contact with the oil sand, usually at the point in the process where the oil sand is contacted by water, increase the amount of oil that partitions or separates to the water phase, thus increasing crude oil recovery.

In mining operations of the type described above, we have found that addition of the hydroxylated acetylenic surfactants to the water phase as the tar sand is washed with water, NaOH and air in the primary separation vessel results in increased recovery of the bitumen in the water phase or froth that is formed. Although this is the preferred format for adding the treatment, the treatment may be added as other steps in the process. The important criterion is that the additive be brought into contact with the oil sands and that the sands be simultaneously or subsequently contacted with water so that the crude can be separated from the sand and clay.

As to the hydroxylated actylenic compounds that may be used to improve the separation of the oil from the oil sands. These may basically be represented by the formula Ia and Ib given above with TMDD-5 and its alkoxylated i.e., ethoxylated and proproxlated versions being preferred. Additionally, other hydroxylated acetylenic surfactants may be mentioned as exemplary. There may be represented by the formula

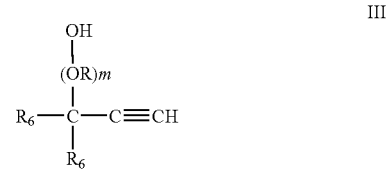

III wherein each $R_6$ group is independently selected and may be H, $C_1$-$C_{10}$ alkyl or an aryl group; R is as defined above and m is defined above. Under this grouping (III), 3,5-dimethyl-1-hexyn-3-ol (DMHO) is preferred.

In the SAGD process, the treatment is preferably added to the steam that is injected into the upper well although the treatment can also be added at a variety of other process locations. The use of volatile surfactants for feed to the steam in SAGD operations allows the surfactants to be continuously replenished during the life of the well so that they can be continuously replenished during the life of the well. In this way, these steam volatile surfactants remain at effective concentrations for long times. Non-volatile or high molecular weight surfactants cannot be fed in this manner since they would not be volatile in steam and would not be transported to the oil or bitumen bearing formation in the earth.

TMDD-5 and DMHO, particularly, have the following properties that make them particularly suited for injection into the steam of SAGD or steam floods in enhanced oil recovery:

1. They are volatile in steam under the pressure and temperature conditions encountered in SAGD and steam flooding operations.
2. They provide demulsification of water in oil emulsions. Thus, they do not create emulsification problems in downstream operations. In fact, this initial feed of demulsifier at the earliest possible point would mitigate the problems.
3. They provide improved removal of bitumen from oil sands ore.
4. They reduce surface tension in water significantly at low concentrations and not to be lost to surfaces like other surfactants (low system demand) which allows them to improve the penetration of the steam and water into the formation/ore.

5. They are also corrosion inhibitors.

There are several situations where volatile surfactants can be used to advantage in the recovery of petroleum or bitumen. In all these applications the surfactant provides a reduction of the surface tension to allow both penetration into the formation and release of the oil from the sand or material of the producing formation.

| | |
|---|---|
| Steam Assisted Gravity Drainage (SAGD); cyclic steam stimulation; steam is used here as well as in Huff and Puff methods. | Steam at temperature up to 350° C. and 165 bar |
| Low Pressure SAGD | Steam at 120 to 220° C. and pressures to 30 bar |
| VAPEX - The surfactants can be added to the diluent if desired. | Hydrocarbon vapors (e.g., propane) rather than steam. |

Examples of Volatile Surfactants:

DMHO bp=160°

VOC (Volatile Organic Carbon) by EPA Method 24 (wt %)=100%

TMDD-5 bp=>160°

VOC by EPA Method 24 (wt % lost at 110° for 1 hour)= 48%

Any surfactant that has sufficient vapor pressure or is volatile in steam or hydrocarbon vapor sufficient to travel with the vapor and produce a significant reduction in the surface tension upon condensation would meet the needs of the invention.

The Vapex system refers to a vapor extraction technology that leads to an increase in the recovery of conventional heavy oil from diverse substrates and underlying geological or subsurface formations. Gaseous solvents are used to increase oil recovery by reducing oil viscosity.

This unique combination of properties makes the steam volatile surfactants, such as the steam volatile hydroxy acetylenic compound, ideal for injection down hole with the steam for the recovery of bitumen in SAGD and also in more conventional steam and surfactant floods for the recovery of oil from diverse substrates and underlying geological or subsurface formations. Other materials with these properties could of course be used. Additionally, the surfactants can be used in supercritical fluid extraction processes using a variety of supercritical fluids such as $CO_2$. The use of the surfactants in secondary oil recovery methods such as in gas reinjection and water flooding can also be mentioned.

The result of the application of the hydroxy acetylenic surfactants in this manner is expected to be manifold, less steam will be needed to produce a barrel of bitumen or crude; better recovery from the ore is expected and will result in more bitumen produced from the formation. These materials are also adjuncts to demulsification and could well act to inhibit the formation of emulsion during production. Thus, the invention includes the step of pre-adding such treatment during production so that a process compatible residue remains in the produced crude and decreases the dosage that is needed in later emulsion breaking or other processing stages.

When the hydroxylated acetylenic compounds or alkoxylated versions thereof (Ia, Ib, III) are used to aid in the separation of bitumen from oil sands and the like, surfactants II such as those mentioned above can also be used as part of the treatment.

Although we have discussed separation of bitumen from oil sands via mining and SAGD operations, the treatments in accordance with the invention can be used to improve separation of oil from crude oil production emulsions and refinery emulsions. In all of these environments, the oil to be recovered is found in the presence of a solids-containing matrix comprising particles such as sand and/or clay. Addition of the treatment will aid in the separation of the oil to the water phase when the oil/solids matrix is brought into contact with wash water or similar water-based operations. The treatments may be employed in amounts of from about 1 ppm-1,000 ppm treatment per one million parts water contained in the water phase such as in a washing operation or steam such as in SAGD or steam flooding operations. More preferably, the treatment may be added in an amount of about 5-500 and even more preferably, 100-500 ppm.

Another problem that has been encountered in the field of oleaginous or organic phase aqueous phase emulsions is that of diesel fuel dehazing. Dehazing may be viewed as a method of removing suspended water droplets from the distillate phase or releasing free water trapped in an emulsion settled from the distillate phase. Gasoline and crude oil distillates may both benefit from this treatment. After being distilled from crude oil, the diesel fraction in particular and other fractionated cuts as well can contain emulsified water that causes the normally clear liquid to be hazy. Demulsifying agents are commonly called "dehazers". In accordance with yet another embodiment of the invention, the hydroxy acetylenic compounds of the invention, represent by the formulae Ia, Ib, or III can be used as an effective antihazing or "dehazers". Especially preferred for use in this regard is 2,4,7,9-tetramethyl-5-decyne-4,7,diol (TMDD-5).

Table 7 below indicates results from ASTM D4176 testing methods used to show effective "dehazing" in diesel fuels. As a comparison, several commercial products were tested and composed in these tests against the performance of TMDD-5.

TABLE 7

Diesel Fuel Dehazing Tests

| | Product | Dose tested | Results | Comments |
|---|---|---|---|---|
| diesel fuel - first refinery | C-1 | up to 300 ppm | no improvement | |
| | C-2 | up to 300 ppm | no improvement | |
| | C-3 | up to 300 ppm | no improvement | |
| | C-4 | up to 200 ppm | no improvement | |
| | C-4 and C-2 | 200 ppm = 300 ppm | slight improvement | Haze improved 1-2 units but dose is not economically feasible |
| | C-5 | up to 300 ppm | no improvement | Commercial company treated in the tank and were not able to reduce |

TABLE 7-continued

Diesel Fuel Dehazing Tests

| | Product | Dose tested | Results | Comments |
|---|---|---|---|---|
| | TMDD-5 | 10 ppm actives | reduced haze | the haze or tank settling time<br>After 12 hours, the haze was reduced from a 6 to approx 3<br>ASTM D4176 haze rating at 3 hours and comments |
| diesel fuel - second refinery | C-6 | 100 ppm | no improvement | 6 |
| | C-6 + 104 TMDD-5 | 90 ppm/10 ppm | no improvement | 6 |
| | C-2 | 100 ppm | slight improvement | Haze improved 3 units over 3 hours |
| | C-2 and TMDD-5 | 90 ppm/10 ppm | no improvement | 6 |
| | TMDD-5 | 50 ppm | considerable improvement | 2 to 3 |
| | TMDD-5 | 25 ppm | considerable improvement | 2+ |
| | TMDD-5 | 10 ppm | clearly passing | 1+ |

C1 = polyol and nonyl phenol formaldehyde resin
C-2 = crosslinked polyol and anionic surfactant
C-3 = EO/PO block type polyol
C-4 = mixture of nonyl phenol formaldehyde resin
C-5 = commercial product It is accordingly apparent that the acetylenic surfactant compound or compounds selected from Groups Ia, Ib, and III and mixtures thereof can be utilized to improve the separation of oil located in the presence of a solids containing matrix including sand and/or clay compounds. The solids containing matrix may include oil sand and the treatment may be used in an amount of 1-1,000, 5-500, and/or 100-500 ppm of treatment based on the water or steam that is used to contact the solids matrix. Further, in methods for producing crude oil from subterranean formations which include not only underground but underwater formations, wherein steam or hydrocarbon vapor is injected into the formation in order to aid in the recovery of the crude, the volatile surfactants in accordance with the invention may be added to the steam or vapor in amounts of 1 to about 10,000 ppm surfactant. One exemplary method includes steam assisted gravity drainage operations for separating crude from tar sand and wherein the volatile surfactant comprises a steam volatile surfactant. The steam volatile surfactant may be selected from the Groups Ia, Ib, and III as disclosed herein. Further, the treatments of the invention can be utilized to resolve emulsions including an organic phase and an aqueous phase. Such emulsions may be formed, for instance, in desalting apparatus, or the emulsion may be a bitumen emulsion, or slop oil emulsion. Further, the emulsion may comprise water, oil, and solid materials such as sands and clays. Also, the emulsion may be located in a froth formation apparatus, and the emulsion may be in the form of an interfacial rag area. Further, the emulsion may comprise a high solids content of about 1-1,000 ppm solid. Also, such emulsions may have asphaltene contents of about 1-20%.

The emulsions may also be located in a heater treater apparatus, free water knockout apparatus, inclined plate separator apparatus, water separator apparatus, hydrocyclone, or centrifuge. The emulsion may be a drilling mud emulsion, such as an inverted slop oil drilling mud emulsion, or the drilling mud emulsion may result from leakage of drilling mud into produced crude oil. The emulsion may also be a refinery slop oil emulsion.

The treatments of the invention may also be utilized to treat such emulsions as distillate fuels by dehazing the emulsion. One common distillate fuel that may benefit from the invention is diesel fuel.

The acetylenic surfactants may also act synergistically when used in combination with quaternary ammonium salts and/or amphoteric salts.

While this invention has been described with respect to particular embodiments thereof, it is apparent that numerous other forms and modifications thereof will be obvious to those skilled in the art. The appended claims generally should be construed to cover all such obvious forms and modifications which are within the true spirit and scope of the present invention.

What is claimed is:

1. A method of improving separation of oil from an oil sands matrix comprising contacting said oil sands matrix with a treatment comprising an acetylenic surfactant compound or compounds selected from the Groups Ia, Ib, and III and mixtures thereof, wherein Group I(a) has the formula

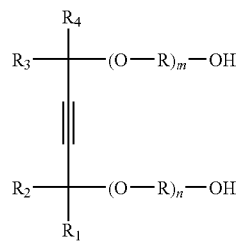

Ia and wherein said Group Ib has the formula

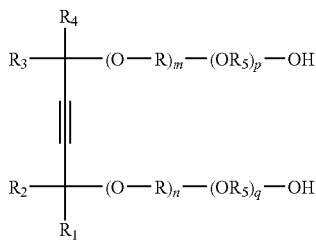

wherein R is —(CH$_2$—CH$_2$—)—; R$_5$ is —(CH$_2$(CH$_3$)CH—)—or —(CH$_2$—CH$_2$—CH$_2$—)—; R$_1$ and R$_4$ are a straight or a branched chain alkyl having from about 3 to 10 C atoms or an aryl group; R$_2$ and R$_3$ are H, an alkyl chain having 1 to 5 C atoms or aryl group, and in, n, p, and q are numbers that range from about 0 to about 30, and wherein said Group III has the formula

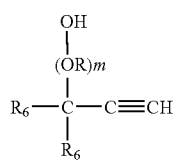

wherein R and m are as previously defined and each R$_6$ is independently chosen from H, C$_1$-C$_{10}$ alkyl or an aryl group, said method further comprising contacting said oil sands matrix with water alkyl or an aryl group, said method further comprising contacting said oil sands matrix with water or steam, said treatment being added in an amount of about 1-1,000 ppm based on one million parts of said water or steam, said method further comprising contacting said oil sands matrix with an additional surfactant (II), said additional surfactant being a polyol having the formula

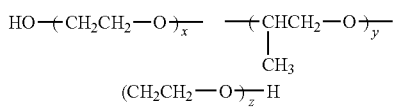

wherein the moieties x, y and z are each at least 1 and are such as to provide the compound with a molecular weight of about 500 or higher.

2. A method as recited in claim 1 wherein said oil sands is washed with said water in order to form a froth or slurry and wherein about 1-1,000 ppm of said treatment is added to said water and wherein said treatment comprises a member or members selected from
 a) 2,4,7,9-tetramethyl-5-decyne-4,7-diol (TMDD-5) and
 b) 2,5,8,11-tetramethyl-6-dodecyne-5,8-diol (TMDD-6) and
 c) 3,5-dimethyl-1-hexyn-3-ol (DMHO) and ethoxylate and propylene oxide derivatives of a); b); and c).

3. A method as recited in claim 1 wherein said oil sands is subjected to steam assist gravity discharge processes in order to improve separation of said crude oil and in which steam is injected into a downhole location, said treatment being added to said steam in an amount of 1-1,000 ppm and wherein said treatment comprises a member or members selected from
 a) 2,4,7,9-tetramethyl-5-decyne-4,7-diol (TMDD-5) and
 b) 2,5,8,11-tetramethyl-6-dodecyne-5,8-diol (TMDD-6) and
 c) 3,5-dimethyl-1-hexyn-3-ol (DMHO) and ethoxylate and propylene oxide derivatives of a); b); and c).

4. Method as recited in claim 1 wherein said additional surfactant (II) has a molecular weight of from about 500 to about 30,000.

5. Method as recited in claim 4 wherein said x and z moieties of said additional surfactant (II) comprise about 20%-80% by weight of said additional surfactant.

6. Method as recited in claim 5 wherein said x and z moieties comprise about 40% by weight of said additional surfactant and said additional surfactant has a molecular weight of about 4,000.

7. In a method of producing crude oil from a subterranean formation wherein steam or hydrocarbon vapor is injected into said formation to aid in recovery of said crude, the improvement comprising adding a volatile surfactant to said steam or vapor hi an amount of about 1-10,000 ppm surfactant based on one million parts of said steam; said method comprising a steam assisted gravity drainage operation for separating crude from tar sand and wherein said volatile surfactant comprises a steam volatile surfactant; said volatile surfactant comprising a steam volatile acetylenic surfactant compound or compounds selected from the Groups Ia, Ib, and III and mixtures thereof, wherein Group I(a) has the formula

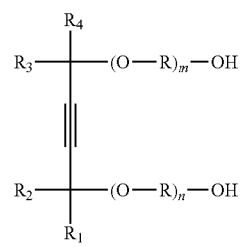

and wherein said Group Ib has the formula

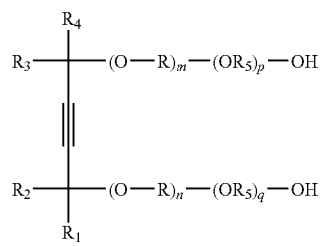

wherein R is —(CH$_2$—CH$_2$—)—; R$_5$ is —(CH$_2$(CH$_3$)CH—)—or —(CH$_2$—CH$_2$—CH$_2$—)—; R$_1$ and R$_4$ are a straight or a branched chain alkyl having from about 3 to 10 C atoms or an aryl group; R$_2$ and R$_3$ are H, an alkyl chain having 1 to 5 C atoms or aryl group, and m, n, p, and q are numbers that range from about 0 to about 30, and wherein said Group III has the formula

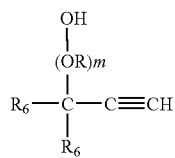

wherein R and m are as previously defined and each $R_6$ is independently chosen from H, $C_1$-$C_{10}$ alkyl or an aryl group, said method further comprising contacting said solids containing matrix with water or steam.

8. A method as recited in claim 7 wherein said acetylenic surfactant compound or compounds are selected from
   a) 2,4,7,9-tetramethyl-5-decyne-4,7-diol (TMDD-5) and
   b) 2,5,8,11-tetramethyl-6-dodecyne-5,8-diol (TMDD-6) and
   c) 3,5-dimethyl-1-hexyn-3-ol (DMHO) and ethoxylate and propylene oxide derivatives of a); b); and c).

9. In a method of producing crude oil from a subterranean formation wherein steam or hydrocarbon vapor is injected into said formation to aid in recovery of said crude, the improvement comprising adding volatile surfactant to said steam or vapor in an amount of about 1-10,000 ppm surfactant based on one million parts of said steam; said method comprising a steam assisted gravity drainage operation for separating crude from tar sand and wherein said volatile surfactant comprises a steam volatile surfactant; said volatile surfactant comprising a steam volatile acetylenic surfactant compound or compounds selected from the Groups Ia, Ib, and III and mixtures thereof, wherein Group I(a) has the formula

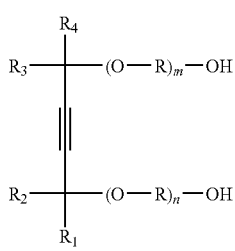

and wherein said Group Ib has the formula

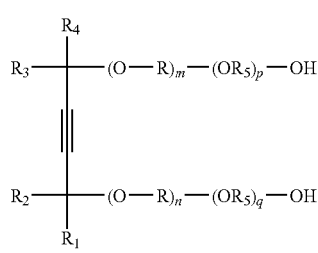

wherein R is $-(CH_2-CH_2)-$; $R_5$ is $-(CH_2(CH_3)CH)-$ or $-(CH_2-CH_2-CH_2)-$; $R_1$ and $R_4$ are a straight or a branched chain alkyl having from about 3 to 10 C atoms or an aryl group; $R_2$ and $R_3$ are H, an alkyl chain having 1 to 5 C atoms or aryl group, and m, n, p, and q are numbers that range from about 0 to about 30, and wherein said Group III has the formula

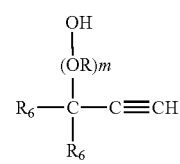

wherein R and m are as previously defined and each $R_6$ is independently chosen from H, $C_1$-$C_{10}$ alkyl or an aryl group, said method further comprising contacting said solids containing matrix with water or steam;

wherein said method further comprises adding an additional surfactant II to said steam or hydrocarbon vapor, said additional surfactant II being a polyol having the formula

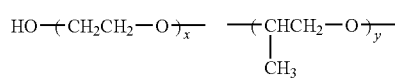

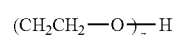

wherein the moieties x, y, and z are each at least 1 and are such as to provide the compound with a molecular weight of about 500 or higher.

10. Method as recited in claim 9 wherein said additional surfactant (II) has a molecular weight of from about 500 to about 30,000.

11. Method as recited in claim 10 wherein said x and z moieties of said additional surfactant (II) comprise about 20%-80% by weight of said additional surfactant.

12. Method as recited in claim 11 wherein said x and z moieties comprise about 40% by weight of said additional surfactant and said additional surfactant has a molecular weight of about 4,000.

* * * * *